Dec. 2, 1969     H. ROSENGREN     3,481,034
SAFETY RAZOR APPARATUS
Original Filed Oct. 20, 1965     10 Sheets-Sheet 1
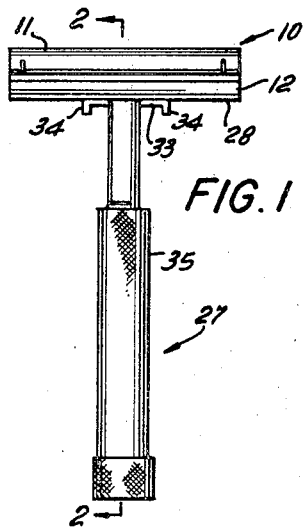
FIG.1
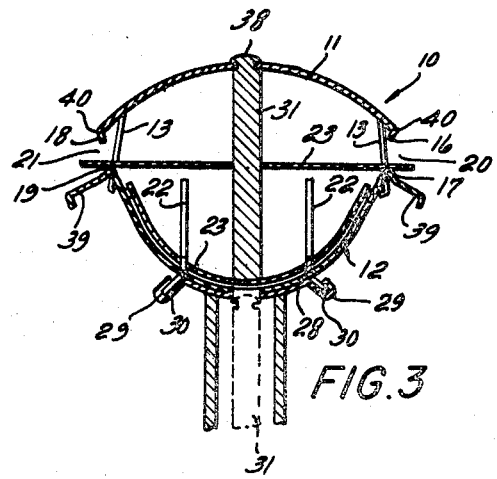
FIG.3
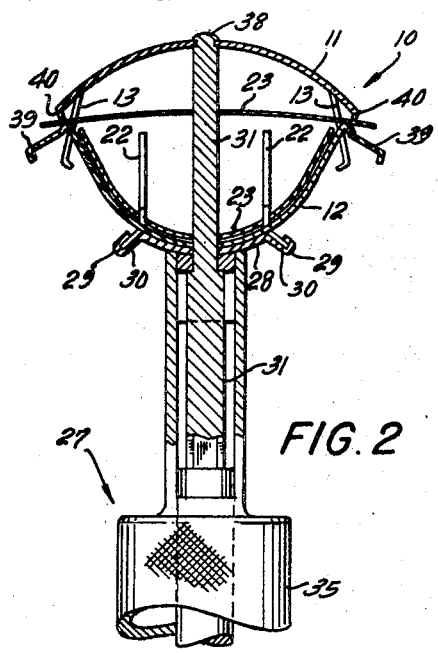
FIG.2
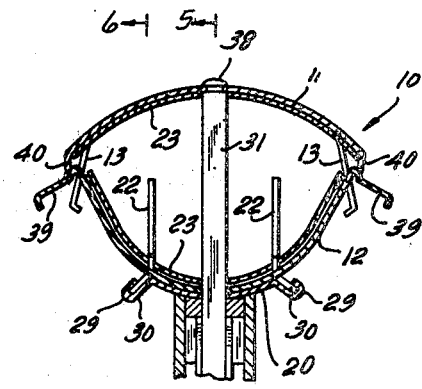
FIG.4
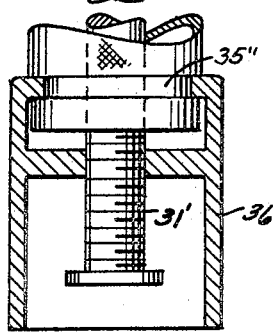
INVENTOR
HERBERT ROSENGREN Dec. 2, 1969  H. ROSENGREN  3,481,034
SAFETY RAZOR APPARATUS
Original Filed Oct. 20, 1965  10 Sheets-Sheet 2
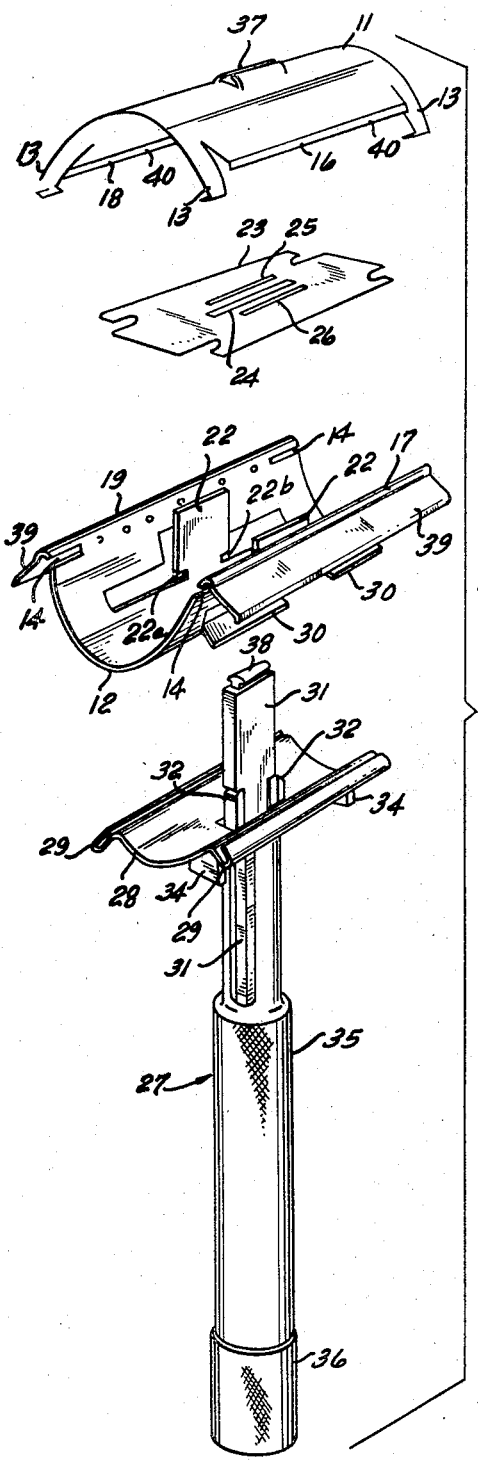
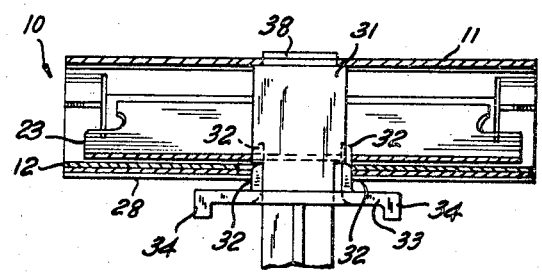
FIG.5
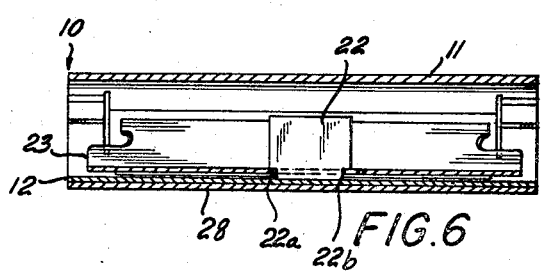
FIG.6
FIG.7
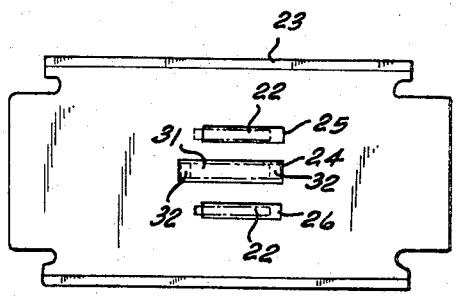
FIG.8
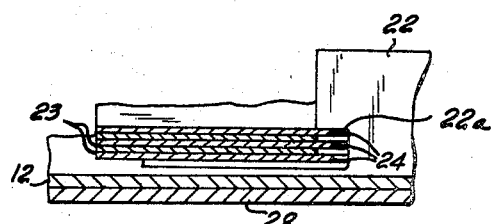
FIG.6a
INVENTOR
HERBERT ROSENGREN

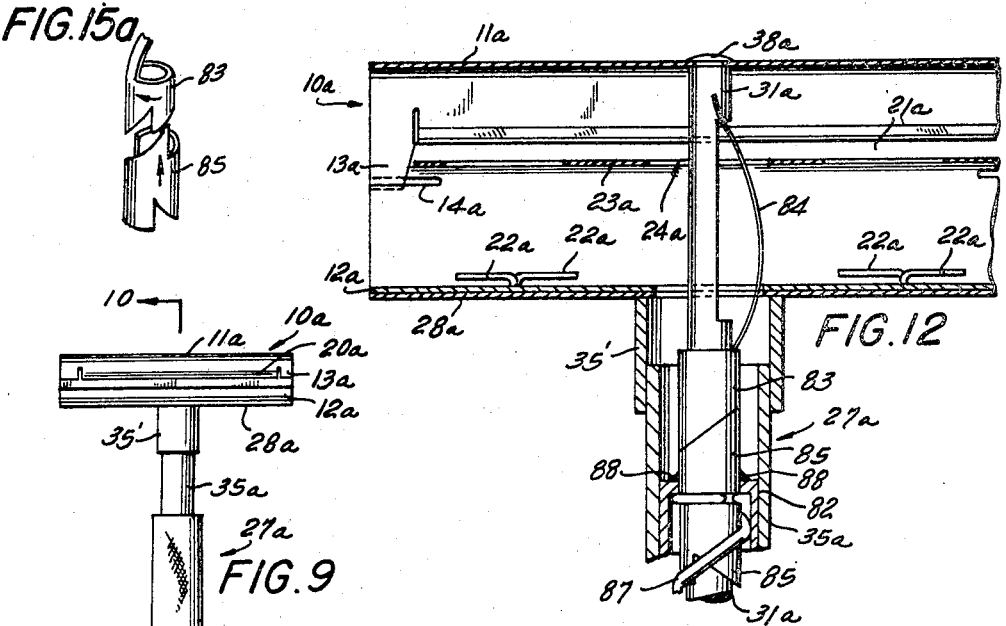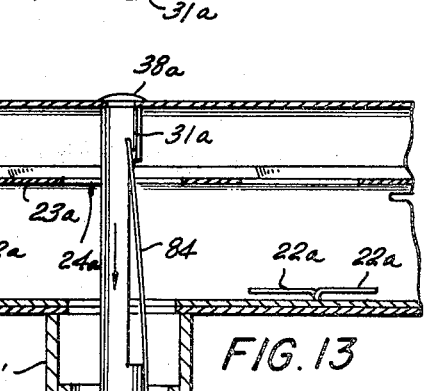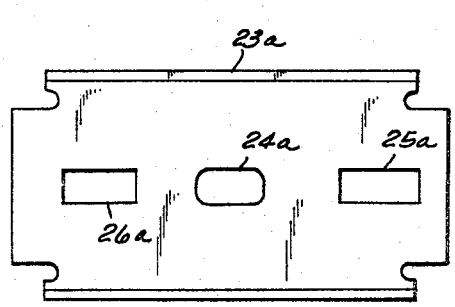

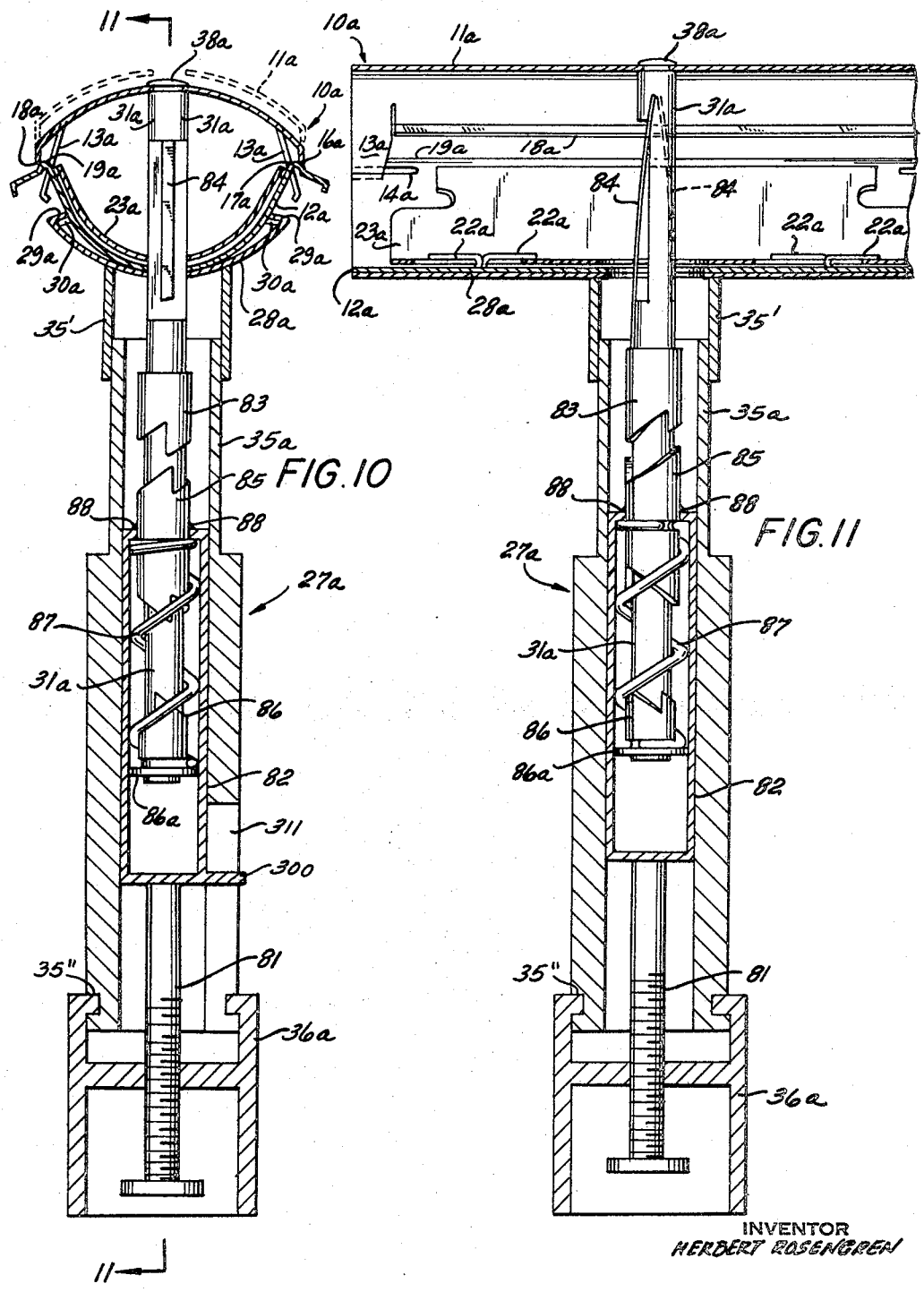

Dec. 2, 1969  H. ROSENGREN  3,481,034
SAFETY RAZOR APPARATUS
Original Filed Oct. 20, 1965  10 Sheets-Sheet 5

INVENTOR
HERBERT ROSENGREN

Dec. 2, 1969     H. ROSENGREN     3,481,034
SAFETY RAZOR APPARATUS
Original Filed Oct. 20, 1965     10 Sheets-Sheet 6
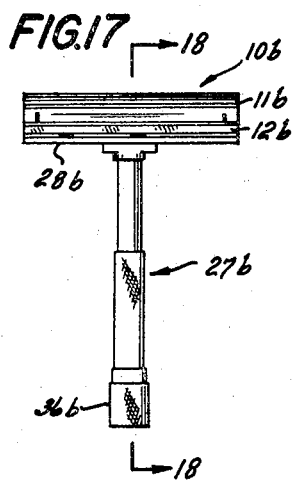
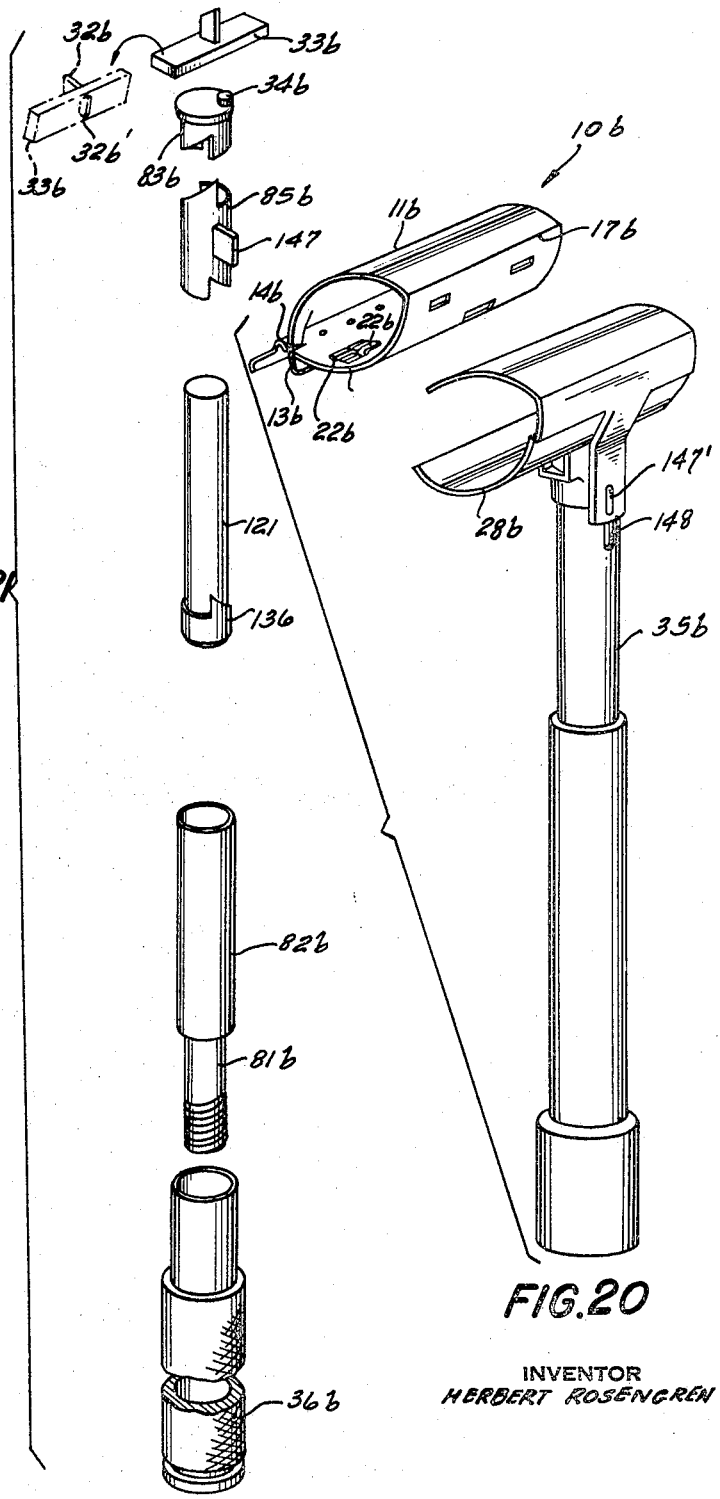
INVENTOR
HERBERT ROSENGREN

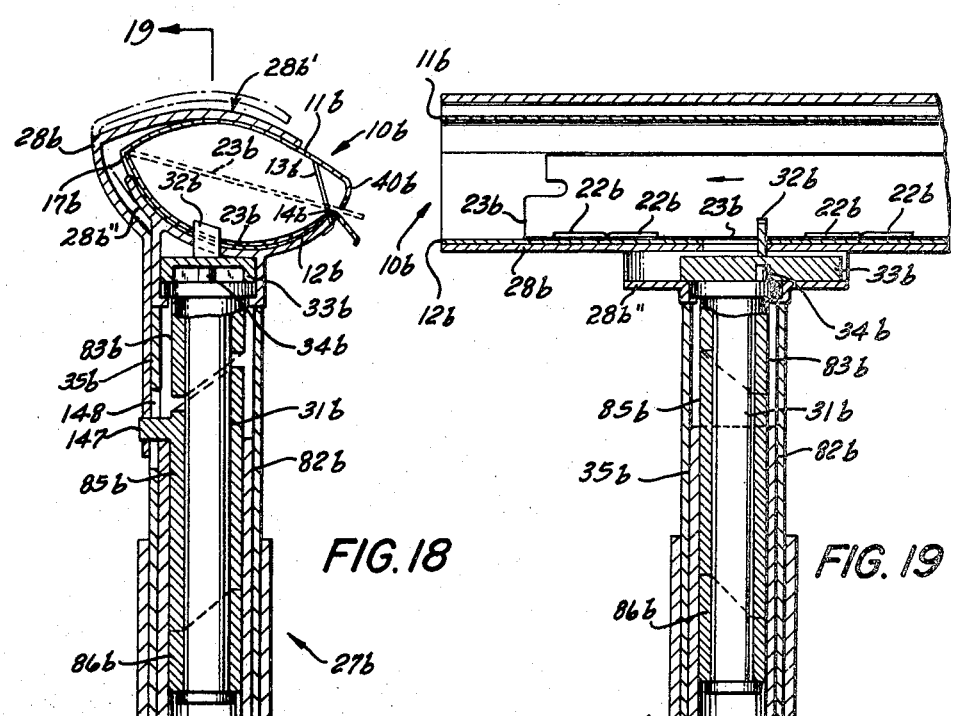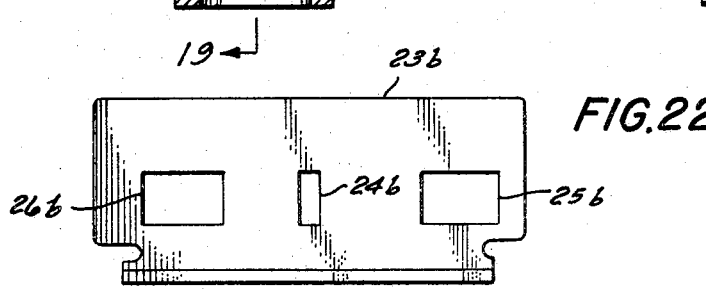

Dec. 2, 1969 H. ROSENGREN 3,481,034
SAFETY RAZOR APPARATUS
Original Filed Oct. 20, 1965 10 Sheets-Sheet 8

INVENTOR
HERBERT ROSENGREN

Dec. 2, 1969    H. ROSENGREN    3,481,034
SAFETY RAZOR APPARATUS
Original Filed Oct. 20, 1965    10 Sheets-Sheet 9
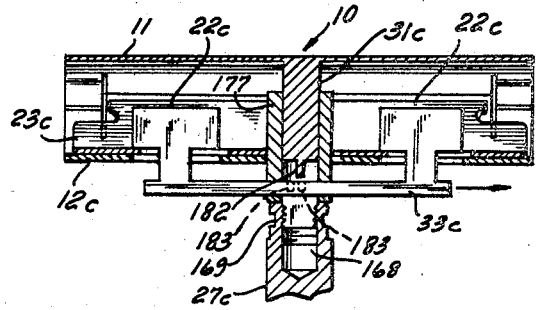
FIG.27
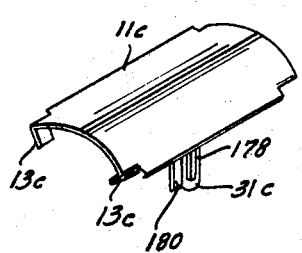
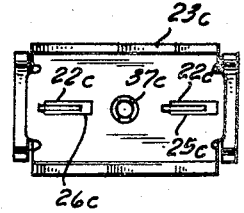
FIG.29
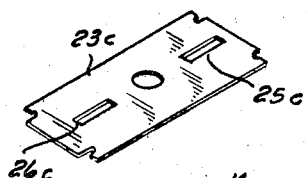
FIG.30
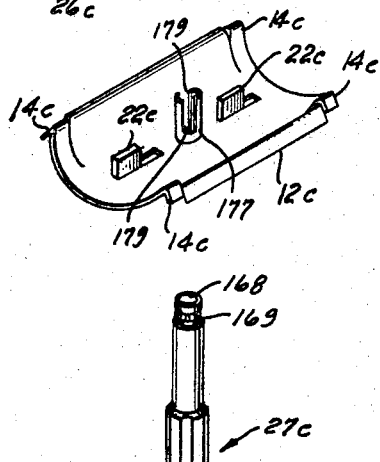
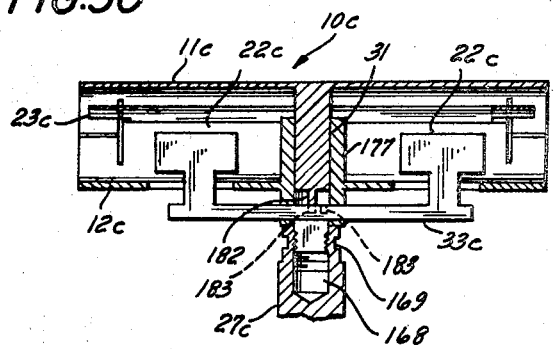
FIG.28
INVENTOR
HERBERT ROSENGREN

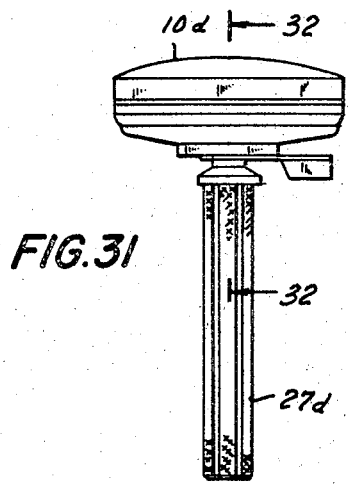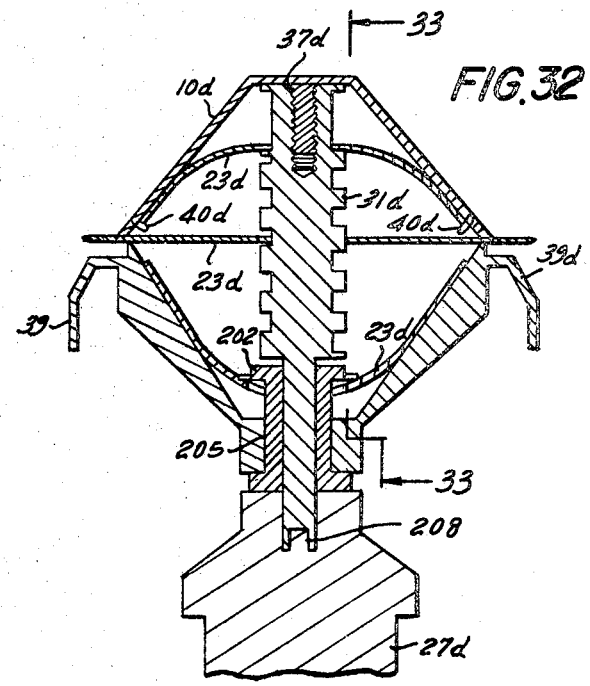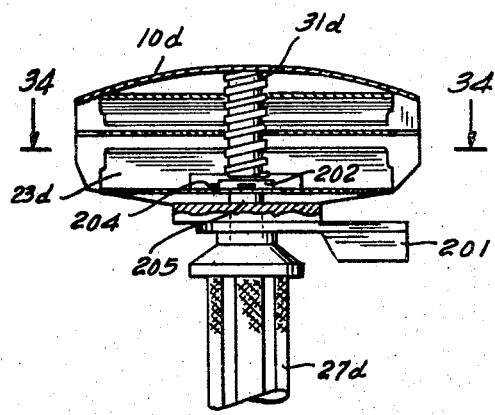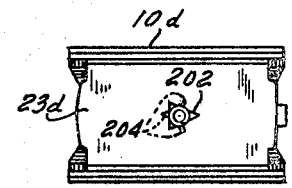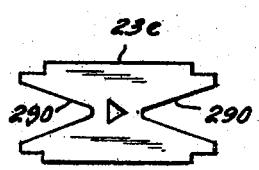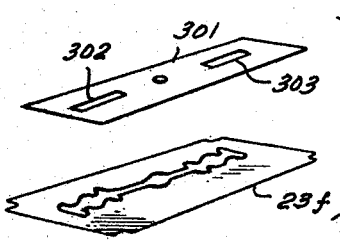

United States Patent Office 3,481,034
Patented Dec. 2, 1969

3,481,034
SAFETY RAZOR APPARATUS
Herbert Rosengren, Woodcliff Lake, N.J. 07675
Original application Oct. 20, 1965, Ser. No. 498,550, now Patent No. 3,388,466. Divided and this application Dec. 29, 1967, Ser. No. 720,426
Int. Cl. B26b 21/22
U.S. Cl. 30—40        8 Claims

ABSTRACT OF THE DISCLOSURE

The present invention relates to a safety razor or like cutting tool having replaceable blades, to a removable cassette in which a plurality of razor blades are stored, and to blades especially adapted for use in such a cassette.

---

This application is a division of application Ser. No. 498,550, filed Oct. 20, 1965, now Patent No. 3,388,466.

Most present day safety razors require the handling of the razor blades each time that a new blade is inserted and a worn blade is removed. It is apparent that any time a razor blade must be handled extreme caution must be exercised otherwise the sharp and, therefore, dangerous edges of the blade may cause injury to the person handling the blade or to someone cleaning up where the blade has been discarded. In addition, a new blade being inserted into the razor may be nicked or dulled or even split by hitting against some harder object.

Various attempts have been made to remove or avoid the hazards of loading and unloading razor blades by supplying blades stacked in magazines. The results of these efforts have been complex, unreliable or costly and generally too large and bulky to provide desired ease and comfort of shaving. One such razor has blades mounted on a rotating cylinder which is indexed so as to have respective blade edges successively project from the razor. The very nature of such a bulky razor makes difficult shaving of certain surfaces, such as on the upper lip, below the nose or on the chin. Razors employing blades mounted on endless belts are also subject to the same shortcomings.

On the other hand, so-called injection type razors, which provide a practical solution to the size problem do not have the desired safety features. Generally, in this type razor, a worn blade is ejected either by the fresh blade being inserted or by the mechanism which inserts the fresh blade or by opening the razor to drop out or manually remove the old blade. Although, handling of the blades may be avoided during loading, the blades are handled either during ejection of a worn blade or after a worn blade is ejected.

Accordingly, it is an object of the present invention to provide a new and improved razor.

Other objects of the present invention are:

To provide a razor which does not require the handling of razor blades either in loading or unloading the razor;

To provide a razor which carries its own supply of replacement blades for a relatively long period of use;

To provide a razor which is simple to operate and inexpensive to fabricate;

To provide for snapping blades into a use position by energy stored in them before sale to the user;

To provide for clamping the blades successively in use position and for adjusting the shaving angle of the blade edge to suit the user;

To dull each blade as it is removed from the blade use position and store the blades with the edges covered thereby reducing the danger from used blades;

To provide multiple blade cassettes which can be quickly and easily inserted into and removed from a safety razor and which are so inexpensive as to be disposable, so light and compact as to be easily carried in one's toilet case and adapted to cooperate with the razor to release its blades one at a time to shaving position in which the cutting edges project out of the cassettes.

A feature of the present invention is that this razor may employ specially made blades or blades of standard configuration.

The foregoing objects are, in general, achieved by making the cassette with a pair of concave, advantageously cylindrical shells. The cassette has at least one longitudinal slot through which a cutting edge of a blade within the cassette projects for shaving. The cassette may be in the form of a single unitary housing or the two shells are separate and adapted to move relative to one another to form and open at least one longitudinal slot for a blade cutting edge. The blades, prior to use, are stored in one of the two shells and upon release snap into a position in which they may be used for shaving. This snapping action is provided by having the blades of thin resilient metal so that when flexed about a longitudinal axis to fit against one of the cylindrical shells and held down in this shell, each blade acts as a spring which is trying to flatten itself. By releasing the blades successively, each when released, jumps up, pushing its edges along the inside surface of the shell until it reached the blade use position. Here it finds a slot or slots through which the cutting edge or edges project.

In order to adjust the shaving angle of the blade, the razor advantageously includes means for pressing the cutting edge of the blade over a fulcrum which not only turns the cutting edge to a desired shaving angle, but also starts the flexing of the blade in the direction which will be required for "dead" storage, that is, storage of used, dull blades. After a blade has become dull by use, the pressing shell comes further down, causing increased flexing of the blade up into the shell, until finally the shell can be pulled down over the cutting edge, thus capturing the blade for removal from the blade use position to dead storage, while other blades in the cassette are being used.

In the specification and in the accompanying drawings there are described and shown illustrative embodiments of the invention and various modifications thereof are suggested, but it is to be understood that these are not intended to be exhaustive, but on the contrary are given for purposes of illustration in order that others skilled in the art may fully understand the invention so that they may modify and adapt it in various forms, each as may be best suited to the conditions of a particular use.

The various objects, aspects and advantages of the present invention will be more fully understood from a consideration of the following specification in conjunction with the accompanying drawings in which:

FIGURE 1 is a front elevation of one embodiment of a razor embodying the present invention;

FIGURE 2 is an enlarged sectional view taken on line 2—2 of FIGURE 1 showing a razor blade positioned for use;

FIGURE 3 is a fragmentary sectional view taken on the same section as FIGURE 2 with a razor blade in the blade use position but prior to clamping for actual use;

FIGURE 4 is a fragmentary sectional view on the same plane as FIGURE 2, but showing a razor blade stored subsequent to use;

Figure 15:
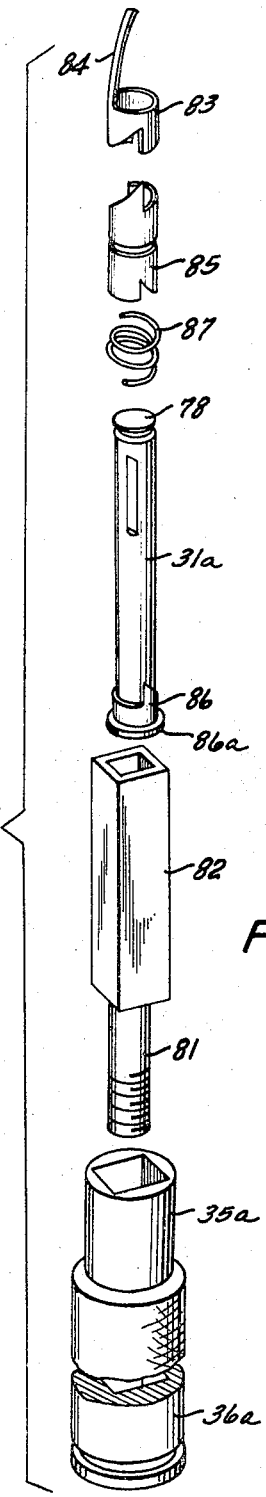
Figure 14:
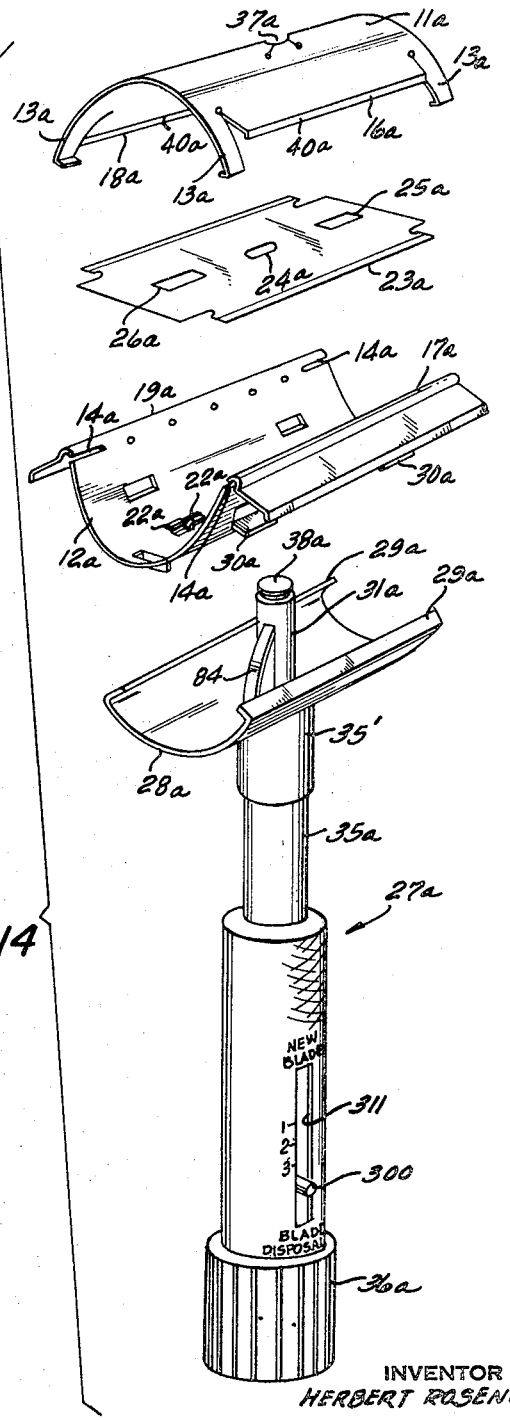
Figure 23:
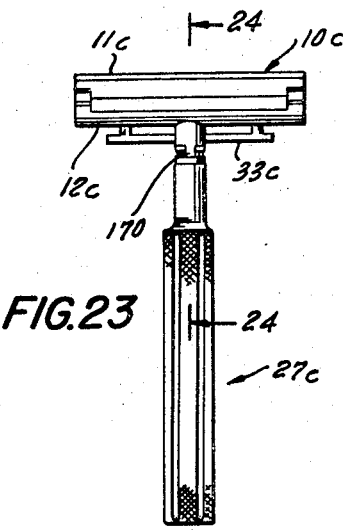
Figure 24:
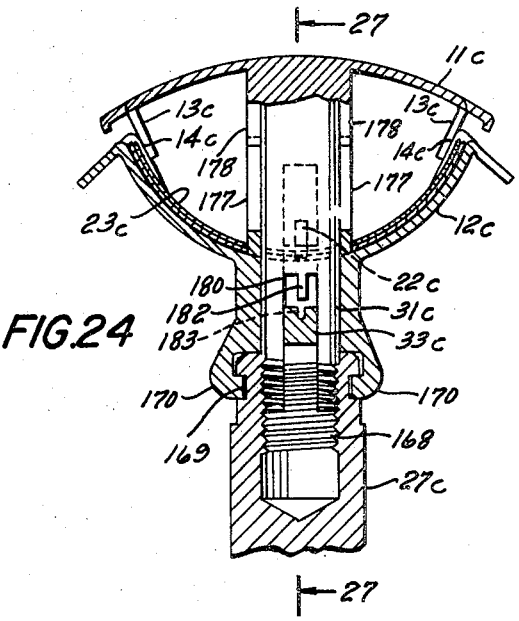
Figure 26:
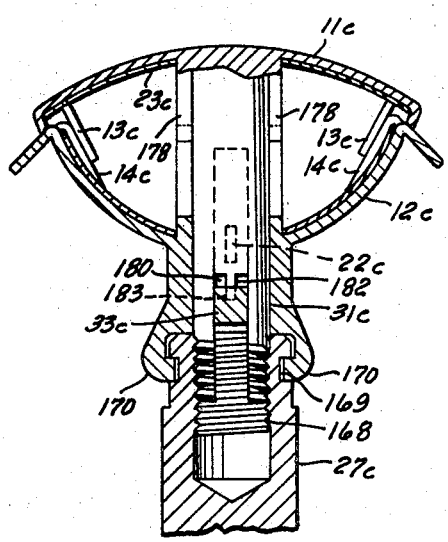
Figure 25:
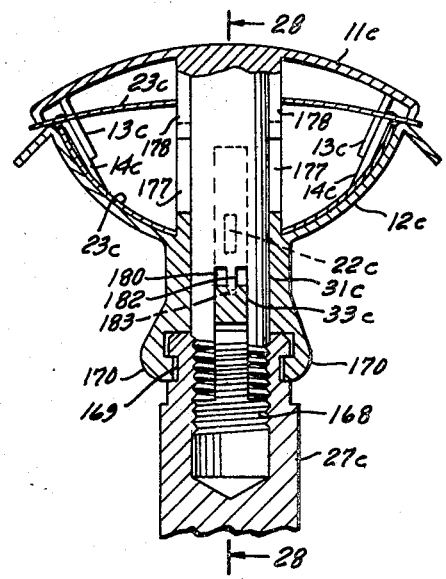

FIGURES 5 and 6 are sectional views taken on lines 5—5 and 6—6, respectively, of FIGURE 4. These figures illustrate the manner in which a razor blade is conveyed to the blade use position of FIGURE 1;

FIGURE 6a is an enlarged detail view of a portion of the razor shown in FIGURE 6, and specifically of a stack of blades at one end of its engaging slots;

FIGURE 7 is an exploded perspective view of the FIGURE 1 embodiment of the invention;

FIGURE 8 is a plan view of a razor blade which may be used in the FIGURE 1 embodiment of the invention with the relation of the fingers 32 and the retaining tabs 22 indicated by broken lines;

FIGURE 9 is a view in front elevation of a second embodiment of the present invention;

FIGURE 10 is an enlarged sectional view taken on line 10—10 of FIGURE 9;

FIGURE 11 is a sectional view taken on line 11—11 of FIGURE 10;

FIGURES 12 and 13 are fragmentary sectional views on the same section which illustrate successive stages in the operation by which a razor blade is conveyed to the blade use position in the FIGURE 9 embodiment of the invention;

FIGURE 14 is an exploded perspective view of the FIGURE 9 embodiment of the invention;

FIGURE 15 is an exploded perspective view of the mechanism which conveys the razor blades from one position to another in the cassette of the FIGURE 9 embodiment of the invention;

FIGURE 15a is a detail showing of portions of the FIGURE 15 mechanism after presetting by action of the back cams 85 and 86;

FIGURE 16 is a plan view of a razor blade which may be employed in the FIGURE 9 embodiment of the invention;

FIGURE 17 is a front elevation of a third embodiment of the present invention;

FIGURE 18 is an enlarged sectional view taken on line 18—18 of FIGURE 17;

FIGURE 19 is a sectional view taken on line 19—19 of FIGURE 18;

FIGURE 20 is a perspective view of the razor of FIGURE 17 with the cassette removed; for clarity of showing the cassette is empty of blades although as used it would contain a number of blades;

FIGURE 21 is an exploded perspective view of the mechanism which conveys the razor blades from one position to another in the cassette of the FIGURE 17 embodiment of the invention;

FIGURE 22 is a plan view of a razor blade which may be employed in the FIGURE 17 embodiment of the invention;

FIGURE 23 is a front elevation of a fourth embodiment of the present invention;

FIGURE 24 is a fragmentary sectional view taken on line 24—24 of FIGURE 23 but with the blades stored prior to use and the upper shell loosened;

FIGURE 25 is a sectional view taken on the same section as FIGURE 24 showing a blade in the use position and the upper shell clamped down ready for use;

FIGURE 26 is a sectional view taken on the same section as FIGURES 24 and 25 with a blade in the used blade storage position;

FIGURE 27 is a sectional view taken on line 27—27 of FIGURE 24;

FIGURE 28 is a sectional view taken on line 28—28 of FIGURE 25;

FIGURE 29 is a plan view of the razor and blade of FIGURE 27 with the upper shell 11c removed to show the blade in the use position;

FIGURE 30 is an exploded perspective view of the FIGURE 23 embodiment of the razor;

FIGURE 31 is a view in elevation of a fifth embodiment of the invention;

FIGURE 32 is a sectional view on enlarged scale on line 32—32 of FIGURE 31;

FIGURE 33 is a sectional view on a smaller scale taken on line 33—33 of FIGURE 32;

FIGURE 34 is a sectional view taken on line 34—34 of FIGURE 33;

FIGURE 35 is a plan view of another razor blade which may be employed in the FIGURE 31 embodiment of the invention; and FIGURE 36 is a perspective view of a razor blade of standard configuration and an adapter according to the invention, showing how the standard blade may be employed in a razor constructed in accordance with the present invention.

FIGURES 1 to 7 are various views of a first embodiment of a razor constructed in accordance with the present invention. This razor has two major parts: a cassette, designated generally by reference numeral 10, and a handle member designated generally by reference numeral 27, having means for engaging the cassette. Cassette 10 comprises an upper elongated concave shell 11 and a lower elongated concave shell 12. The two shells 11 and 12 are joined together by means which permit relative vertical movement between the shells. In particular, the upper shell 11 has four resilient corner tabs 13, one in each corner of the shell, which slide within four corner slots 14, best shown in FIGURE 7, which are cut into the lower shell 12 near the four corners of the lower shell. This sliding engagement of the tabs 13 with the corner slots 14 provides for relative movement between the shells 11 and 12. As the two shells 11 and 12 are drawn together the corner tabs 13 slide downward through the corner slots 14 and bend outward. When the two shells move apart, the corner tabs 13 slide upward through the corner slots 14 and move inward.

The adjacent longitudinal edges 16, 17 and 18, 19 of the shells 11 and 12 form a pair of elongated slots 20 and 21, best shown in FIGURE 3. As shown in FIGURES 2 and 3, these slots provide for a pair of blade cutting edges to project from the cassette 10 when a blade 23 is positioned for use.

Although a "blade 23" is referred to herein, it should not be assumed that the blade thickness is as shown in the drawing. Ordinarily, the blades will be very thin, for example, less than ten thousandths of an inch, which is not feasible to represent in a stack by lines which must be as wide or wider than that dimension. Accordingly, the space designated by 23 represents the blade and a stack of blades. FIGURE 6a indicates the stack by a very much magnified thickness.

The lower shell 12 is provided with means for retaining a plurality of blades 23. For the embodiment being described, such means include a pair of retaining tabs 22 extending upward from the inside surface of the lower shell 12. The blades 23 are stacked and retained in the lower shell 12 in flexed condition under the retaining tabs 22, respectively. The lower shell 12 serves as the first blade storage portion of the cassette 10 for storing new blades prior to being used.

FIGURE 8 illustrates the configuration of a razor blade 23 which may be utilized in the FIGURE 1 embodiment of the invention. Blade 23 is seen to have three slots 24, 25 and 26 extending parallel to the longitudinal axis of the blade. Center slot 24 is disposed symmetrically on the blade 23, while the upper and lower slots 25 and 26, respectively, are disposed asymmetrically. The right-hand edges of the slots 25 and 26 are closer to the right-hand blunt edge of the blade 23 than the left-hand edges of these slots are to the left-hand blunt edge of the blade. When an identical blade is inverted end-for-end and positioned against the blade shown in FIGURE 8 and the blunt or non-cutting end edges of both blades are aligned, the end edges of the slots 25 and 26 of the two blades are offset. The blades 23 are stacked so that alternate blades in the stack are inverted to have the right-hand edges of the slots 24, 25 and 26 aligned, while the intermediate blades have the left-hand edges of the slots aligned. For purposes of explanation only, the blade as illustrated in FIGURE 8 will be referred to as a right-hand blade while a blade positioned with the left-hand edges of the slots 24, 25 and 26 aligned will be referred to as the left-hand blade and these blades will be referred to as oriented in opposite directions.

The blades are loaded into the cassette 10 by passing the retaining tabs 22 through the slots 25 and 26 of the blades. The blunt blade ends are aligned and if the surface blade is a right-hand blade the entire stack is moved to the right as shown in FIGURE 6 so that it fits under the retaining tabs 22 in a pair of cutout slots 22a. Only one cutout slot 22a is shown in FIGURE 7. If the surface blade is a left-hand blade, the entire stack is moved to the left so that the surface blade fits under the retaining tabs 22 in a pair of cutout slots 22b. Only one cutout slot 22b is shown in FIGURE 7.

This shaping and stacking of the blades 23 in such that as the blade stack is moved a predetermined amount the surface blade of the stack is released from the retaining tabs 22 and the new surface blade is retained by the retaining tabs. Specifically, as the blade stack is moved a predetermined distance in one direction parallel to the longitudinal axis of the cassette 10, the surface blade moves out from the cutout slots 22a and 22b. FIGURES 5 and 6 depict a movement to the left of the blade stack so that the surface blade is freed from the cutout slots 22a. The slots 25 and 26 are of sufficient length to prevent the surface blade from entering into the opposite cutout slots 22a or 22b as the stack is moved. The surface blade is, thus, released.

Upon release of the blade, the flexure of the blade forces it to move upward. As the blade slides upward along the retaining tabs 22 it relaxes and moves into the blade use position as shown in FIGURE 3. In this position, the blade is disposed horizontally and rests on the edges 17 and 19. The new surface blade, oriented in an opposite direction to the released blade, enters the cutout slots 22a or 22b when the stack is moved in the first direction and is retained under the retaining tabs 22. The new surface blade is only released when the blade stack is moved the predetermined distance in the opposite direction. The blades 23 are, in this manner, released from the first or new blade storage portion in the lower shell 12 one at a time.

The handle 27 has at its upper end a cradle 28 having a pair of channels 29 which receive four cradle tabs 30 which extend downward from the lower shell 12. The cradle 28 receives the cassette 10 by means of a sliding insertion from either end with the cradle tabs 30 sliding along the channels 29. During insertion of the cassette 10, an operating rod 31 of the handle 27 is retracted to a position shown dotted in FIGURE 3, in a manner to be described hereinafter, so as to permit the cassette to be inserted without any obstruction. At the same time that the operating rod 31 is retracted, a pair of fingers 32 (see FIGURE 7), movable vertically with the operating rod, is also retracted.

Fingers 32 serve to move the stack of blades 23 back and forth to release the blades one at a time from the retaining tabs 22. The fingers 32 extend upward from a sliding member 33 which passes through a passageway extending through the operating rod 31 and has a pair of end members 34. A user of the razor places his thumb against one end member 34 and his index finger against the other end member 34 and moves the sliding member 33 back and forth to release the blades first at one side and then at the other. As the slots 24 are symmetrically located, the edges of all blades are aligned at the ends of these slots.

With the operating rod 31 in the position shown in FIGURE 3, the fingers 32 extend up through the blade stack and, as shown dotted in FIGURES 5 and 8, the outer surfaces of the fingers bear against the edges of the blades at the respective ends of slots 24. When the sliding member 33 is moved, for example, to the left, the outer surface of the left-hand finger 32 pushes against all blades at the left-hand edge of the slots 24 with the result that the entire blade stack is moved to the left.

The top blade of the stack having its slots 25 and 26 offset a little had originally allowed the blade to be retained by engagement under the retaining tabs 22 when the stack was at the right-hand end of its movement; but is released from the retaining tabs when moved to the left. The next blade which comes to the surface of the stack, being oriented opposite to the just released blade, is held under the retaining tabs 22, but will be released when the blade stack is moved to the right. The horizontal blade 23 in FIGURE 3 illustrates the released blade in the use position with the blade edges projecting through the elongated slots 20 and 21.

It should be noted that the four corner tabs 13 are slightly tapered. These corner tabs 13 serve to guide the released blade, their tapers compensating for any off-center release of blades as the stack is moved back and forth.

Referring to FIGURES 2 and 7, the handle 27 is composed of a tubular member 35 and a rotatable knob 36. The upper end of the tubular member 35 is affixed to the cradle 28. The knob 36 engages the groove on the lower end of the tubular member 35 so that it is captive but in sliding rotatable engagement with the tubular member. The lower end of the operating rod 31 has a threaded portion 31' which is received by a threaded opening in the knob 36. The upper end of the operating rod 31 is of square or splined or other cross-section adapted to prevent the rod from rotating within the tubular member 35.

As the rotatable knob 36 is turned, the operating rod 31 slides upward or downward within the tubular member 35 dependent upon the direction of the rotation of the knob. Assuming a right-hand thread and clockwise rotation of the knob 36, as viewed from the lower end of the razor, the operating rod 31 is drawn downward. As the knob 36 is rotated counterclockwise, the operating rod is moved upward. Viewing from the lower end of the razor will be assumed for all further references to the rotation of the rotatable knob 36.

In order to retract the operating rod 31 to the position shown dotted in FIGURE 3, the knob 36 is rotated clockwise a sufficient amount to draw the operating rod downward the required distance. After the cassette 10 has been inserted into the cradle 28, the operating rod 31 is moved upward by a counterclockwise rotation of knob 36.

The upper shell 11 of the cassette 10 is provided with means for engaging the operating rod 31. In particular, for the embodiment shown in FIGURES 1 through 7, the upper shell 11 has a lanced catch 37 adapted to receive the head 38 positioned at the top of the operating rod 31. As the operating rod 31 moves upward by the action of turning the knob 36, the head 38 fits into and is captured by the lanced catch 37, the edges of the catch snapping under the head.

After a blade 23 is released from the lower shell 12 to the use position as shown in FIGURE 3, the operating rod 31 is drawn downward by a clockwise rotation of the knob 36. As the operating rod 31 is drawn downward, the upper shell 11, secured to the operating rod by the lanced catch 37 and insert 38, is also drawn downward. As the upper shell 11 moves downward, the edges 16 and 18 of the upper shell, bearing against the top surface of the blade 23, and the edges 17 and 19 of the lower shell 12, bearing against the bottom surface of the blade, impart a curvature to the blade. This is shown in FIGURE 2. The amount of curvature in the blade 23 is adjusted by the amount that the upper shell 11 is drawn downward. Any curvature which will result in the desired comfort and ease of shaving may be set for a particular user of the razor.

A pair of shaving guards 39 are provided on the lower shell 12. These bars are normally found on razors and serve to bear against the surface being shaved to prevent injury. It should be noted, that the shaving guards 39 may be a part of the cradle 28 instead of the cassette 10.

After a particular blade 23 has been used sufficiently and has become worn, it is moved out of the blade use position so that a new blade may be positioned for use. Accordingly, a razor constructed in accordance with the present invention includes means for moving the blade from the blade use portion of the cassette 10 to a second blade storage portion. For the embodiment shown in FIGURES 1 through 7, this is accomplished by first moving the upper shell 11 further downward. The upper shell 11 is provided with a pair of lips 40 which extend downward toward the lower shell 12, their bottom edges being designated 16 and 18. As the operating rod 31 is drawn further downward, thereby pulling the upper shell 11 further downward, the adjacent longitudinal edges 16, 17 and 18, 19 impart a greater curvature to the blade 23 and force the blade to move upward into upper shell 11. At a particular point, the lips 40 snap over the cutting edges of the blade 23 thereby capturing the blade. This is illustrated in FIGURE 4.

Next, the rotation of the knob 36 is reversed so that the operating rod 31 is moved upward thereby moving upper shell 11 upward and away from the lower shell 12 to move the captured blade away from the blade use position. The upper shell 11 is moved to the same position as that shown in FIGURE 3 thereby opening the slots 20 and 21 formed by the adjacent longitudinal edges 16, 17 and 18, 19 so that a new blade may be extended through these slots when released from the retaining tabs 22.

The razor is so designed as to prevent accidental release of a new blade from the lower shell 12 unless the upper and lower shells are apart and the slots 20 and 21 are formed. This insures sufficient clearance for a released blade to move into the use position without the blade edges hitting the lips 40. With the operating rod 31 and the upper shell 11 in the positions illustrated in FIGURE 2, the fingers 32 on the blade release mechanism are, as shown in FIGURE 5, at a level below the stack of blades. With the operating rod 31 and the upper shell 11 in the positions illustrated in FIGURE 4, the fingers 32 are at an even lower level. The dotted lines in FIGURE 5 show the fingers 32 at a raised level at which the fingers are effective to move the blade stack back and forth to release successive blades. In order to move the fingers 32 to the level at which the blades may be released, operating rod 31 must be moved upward sufficiently so that the fingers 32 moving with the operating rod extend through slots 24 of the entire blade stack. This position of the operating rod 31 corrsponds to the upper shell 11 being moved to its uppermost position as shown in FIGURE 3 with the captured blade having been carried away from the blade use position.

After the last blade 23 of the stack has been used and captured by the upper shell 11, the knob 36 is turned clockwise so as to retract the operating rod 31. The head 38 snaps out of the lanced catch 37, so that the operating rod 31 may be retracted to the position shown dotted in FIGURE 3. The cassette 10 is now free to be released from the handle member 27 by a lateral sliding and a new cassette may be inserted.

FIGURES 9 through 15a are various views of a second embodiment of a razor constructed in accordance with the present invention. The basic operative steps with the second embodiment are similar to those described above. The two embodiments differ, however, in the manner in which the various steps are carried out. Elements in the second embodiment corresponding to elements in the first embodiment have been given the same reference numerals followed by the character "a."

A handle 27a includes sleeves 35a and 35' secured together and to the cradle 28a, for example, by brazing, and a knob 36a. A stack of blades 23a represented by a single blade showing is supplied in the lower shell 12a of the two piece cassette 10a. The stack of blades 23a is retained in the lower shell 12a by means of retaining tabs 22a. A plan view of a blade 23a is shown in FIGURE 16. Each blade is asymmetrical in that the right-hand end of slot 25a is closer to the right-hand end edge of the blade than the left-hand end of slot 26a is to the left-hand end edge of the blade. When an identical blade is inverted and positioned against the blade shown in FIGURE 16 and the blunt or noncutting end edges of both blades are flush, the end edges overlap at the slots 25a and 26a. The blades 23a when loaded into the cassette 10a are thus alternately inverted so that the retaining tabs 22a pass through the slots 25a and 26a, respectively of the alternate, oppositely oriented blades. The blunt blade ends in the stack are pushed first to the right and then to the left, to release successive blades, each, in turn, being held under the retaining tabs 22a until such shift.

The blades 23a are held down in concave conformity to the cassette, flexed by the retaining tabs 22a. In order to release the blades one at a time from the retaining tabs, the blade stack is moved back and forth parallel to the longitudinal axis of the cassette in the same manner as the blade stack 23 in the embodiment shown in FIGURES 1 through 7.

After a blade is released from the retaining tabs 22a, it snaps up to the blade use position pushing its sharp edges out through slots 20a and 21a. The upper shell 11a is moved downward by means of four corner tabs 13a sliding in four corner slots 14a in the lower shell so that the adjacent longitudinal edges of the upper and lower shells press the blade into the desired curvature for use in the razor.

A worn blade is removed from the blade use position by drawing the upper shell 11a downward so that a pair of grasping lips 40a snap over the blade edges and capture the worn blade.

The operation of this second embodiment may be best understood by going through a complete cycle of operation. Prior to inserting a new cassette 10a, the operating rod 31a is retracted into the handle 27a. This is accomplished by rotating the knob 36a in a clockwise direction, as viewed from the lower end of the razor. By rotating knob 36a clockwise, a bolt 81 in threaded engagement with the knob 36a is drawn downward. Secured to the bolt 81 is a tubular shank 82 of square cross-section.

The operating rod 31a is coupled to the tubular shank 82 by the spring 87 engaged in grooves in two ratchet-shaped cam members 85 and 86. Cam 85 is shown brazed or welded to shank 82 while cam 86 is affixed to the operating rod 31a. Thus, when shank 82 is drawn downward by threaded member 36a, rod 31a is drawn downward with it.

After the operating rod 31a is retracted sufficiently, the cassette 10a is slid laterally into the cradle 28a, which is provided with lips 29a engaging cradle tabs 30a on the side of the cassette 10a.

The operating rod 31a has associated with it another ratchet-shaped cam member 83. This cam 83 is free to rotate about and move along the operating rod 31a except for a leaf spring 84 anchored at the top of the operating rod 31a and also secured at its bottom to the cam 83. The cam 85 is free to move along the operating rod 31a, but is unable to rotate since it is affixed to the square shank 82. The square shank 82, in turn, is prevented from rotating because it is positioned within a square bore in the sleeve 35a. The cam 86, having a flange 86a on its lower end, is affixed to the operating rod 31a so that it moves upward and downward with the operating rod and rotates with the operating rod. The coil spring 87, surrounds the cams 85 and 86 on the operating rod 31a, with its upper and lower ends rotatably secured at the cam 85 and the flange 86a, respectively.

As the knob 36a is turned counterclockwise, the bolt 81 and the shank 82 move upward. The spring 87 is sufficiently stiff to effect a substantially rigid coupling between the top of the shank 82 and the bottom of the operating rod 31a so that the operating rod also moves upward.

The operating rod 31a passes through the symmetrically disposed center slot 24a of the blade 23a shown in FIGURE 16 with the leaf spring 84 in close proximity to the end edges of slot 24a. Upward movement of the shank 82 causes the cam 85 to move upward, as the two are connected together at 88. Eventually, the cam 85 engages 83. Prior to such engagement of the cams 83 and 85, the head 38a at the top of the operating rod 31a engages the lanced catch 37a in the upper shell 11a. Further upward movement of the operating rod 31a moves the upper shell 11a upward to the position shown in FIGURE 11 and dotted in FIGURE 10, thereby opening slots between the adjacent longitudinal edges 16a, 17a and 18a, 19a of the upper and lower shells.

The engagement of cams 83 and 85 takes place after the upper shell 11a is in its upper position. Further upward movement of the shank 82 causes the coil spring 87 to extend, since the upper shell blocks further upward movement because of the corner tabs 13a engaging the underside of the lower shell 12a.

When cam 85 first engages cam 83, the resistance of 83 to rotary motion is less than its resistance to upward movement so that cam 83 will be turned by pressure on the sloping cam faces during further upward movement of cam 85. This engagement is shown in detail in FIGURE 15a. As cam 85 moves upward, cam 83 is turned counterclockwise approximately 180° with a snapping type movement. This rotation of cam 83 causes the operating rod 31a to rotate in the same direction since cam 83 and the operating rod 31a are connected by the leaf spring 84. This movement is indicated by the broken line representation of spring 84 on the right in FIGURE 11 and the position of the operating rod 31a in FIGURE 12. Cam 86, being fixed to the operating rod 31a, turns with it.

With the operating rod 31a in this new position, further turning of the knob 36a causes cam 83 to be driven upward by cam 85 since the cams 83 and 85 are fully engaged so that no further relative rotational movement can occur between them. Upward movement of cam 83 causes the leaf spring 84 to flex and bow out in the manner shown in FIGURE 12. Upon such flexure, leaf spring 84 bears against the end edges of blades in slots 24a and is effective to push the stack of blades to the right, thus releasing the surface blade from the retaining tabs 22a. The released blade snaps into the blade use position in the same manner as described in connection with the first embodiment.

In FIGURES 12 and 13, blades 23a are shown stored in the used blade position at the top of the cassete and in the reserve blade position at the bottom as well as in the use position at the center. Again it is to be understood that the drawing does not distinguish between a single blade and stacks of blades.

After a blade is released from the lower shell 12a to the blade use position, the operating rod 31a is drawn downward by clockwise rotation of the knob 36a. The initial clockwise movement of the knob permits the extended coil spring 87 to return to its initial condition. After this occurs, the coil spring 87 again effects a substantially rigid coupling between the shank 82 and the operating rod 31a. Additional downward movement of the shank 82 draws the operating rod 31a and the upper shell 11a downward. Downward movement of the upper shell causes the longitudinal edges 16a, 17a and 18a, 19a to clamp and impart the desired curvature to the blades 23a in the blade use position.

After the blade in the blade use position becomes worn it may be replaced by a new unused blade: The operating rod 31a and the upper shell 11a are moved further downward by additional clockwise rotation of the knob 36a until the grasping lips 40a on the upper shell snap over the cutting edges of the blade (as in FIGURES 4 and 26). After the worn blade is captured, downward movement of 31a and 11a is ended, and further clockwise rotation of the knob 36a compresses the coil spring 87 until the cam 85 engages cam 86. These cams translate the axial force imposed on them to rotational movement which is imposed thereby on the operating rod 31a, and cam member 83 attached thereto.

The purpose of this slight rotation of cam 83 is to adjust the cam 83 to a position in which its sloping face will engage the sloping face of cam 85 when cam 85 is moved upward for the next blade release, and peak to peak engagement, or peak to valley are avoided, which if allowed to occur would render the cams inoperative so that subsequent upward movements of screw 81 and cam 85 would only cause a repetition of the flexure of the leaf spring 84 in the same direction as before which would not result in the next blade being released. By imparting this rotary movement to cam 83 after the worn blade has been captured, a new blade cannot be released until after the worn blade has ben stored. Thus, only one blade at a time will be located in the blade use position.

FIGURES 17 through 21 show a third embodiment of the present invention. This embodiment is similar to the first and second embodiments, but differs from them, first in the manner in which the various steps are carried out and second, in that the third embodiment is a single edge razor, while the first two are double edge razors. Here as with the second embodiment like reference numerals are used for corresponding elements in the embodiments but adding a "b" where it is desired to distinguish them.

The stack of blades 23b is retained in the lower shell 12b of the cassette 10b. The cassette also includes a second or upper elongated concave shell 11b. The upper and lower concave shells 11b and 12b are hinged together along one longitudinal edge 17b and held together at the opposite longitudinal edge of the cassette by a pair of corner tabs 13b, only one of which is shown in each of the FIGURES 18 and 20. The corner tabs 13b slide within a pair of corner slots 14b cut into the lower shell 12b. Since the corner tabs are in sliding engagement with corner slots, relative rotary movement between the upper and lower shells about the hinged edge 17b is possible. The adjacent longitudinal edges of the shells form an elongated slot, best shown in FIGURE 18, from which a blade edge may project when a blade is positioned for use.

The stack of blades 23b is retained in the lower shell 12b by means of retaining tabs 22b. A plan view of a blade 23b is shown in FIGURE 22. The blade is asymmetrical and similar to the blade 23a shown in FIGURE 16, except that blade 23b is a single edge blade. In particular, the blade 23b has its right-hand slot 25b closer to the right-hand blunt edge of the blade than its left-hand slot 26b is to the left-hand blunt edge of the blade. The blades 23b are loaded into the cassette 10b with successive blades oriented so as to bring the slots over (and overlapped with) slots of adjacent blades and vice versa. The blunt blade ends are flush, as also are the edges at the center opening for 32b. Thus, when the stack is pushed either to the right or to the left, the surface blade will be released from under the retaining tabs 22b, while the next succeeding blade is held. The reserve blades 23b are held stacked in flexed condition under the retaining tabs 22b.

After a blade is released from the retaining tabs 22b to the blade use position, as shown in broken lines in FIGURE 18, the upper shell 11b is rotated toward the lower shell 12b about its hinged axis at 17b so that the adjacent longitudinal edges of the upper and lower shells impart the desired curvature to the blades 23b in the use position and the razor may then be used. A worn blade is removed from the blade use position by drawing the upper shell 11b further toward the lower shell 12b so that a grasping lip 40b snaps over the blade edge and captures the worn blade. By rotating the upper shell 11b away from the lower shell 12b the captured blade is moved away from the blade use position.

The mechanism which conveys the razor blades from one position to another in the cassette 10b is similar to that of the second embodiment, but in the mechanism shown in FIGURE 21, the operating rod 31b does not extend to nor is it engaged by the upper shell 11b; and this embodiment of the invention employs a different technique for drawing the two shells 11b and 12b together and for moving the two shells apart. Also, a different technique is employed for moving the blade stack back and forth to release the blades successively from the retaining tabs 22b.

A slot and bell crank type mechanism is employed in this third embodiment for releasing the blades 23b from the retaining tabs 22b. Specifically, a slide 33b having an upward projection 32b is engaged by an eccentric crank 34b in a slot 32b' shown in phantom. The slide 33b is constrained to slide within a channel at the base of the lower shell 12b, best shown in FIGURES 18 and 19. As the crank 34b is orbited about the center of the cam member 83b to which it is affixed, the crank slides back and forth in the slot 32b' and imparts a translatory movement to the slide 33b.

The operating rod 31b has associated with it three cams like those of FIGURES 9–15. The first cam 83b is affixed to the operating rod 31b and rotates with it. The top of cam 83b, to which the crank 34b is affixed, is secured to the cam 83b and is advantageously integral. The cam 83b is constrained from moving vertically by the cassette 10b as shown in FIGURES 18 and 19.

The operating rod 31b is affixed to cam 83b and is also constrained from moving vertically. The second cam 85b is free to move along the operating rod 31b, but is constrained from rotating by outward projection 147 (FIGURES 18 and 20) extending through a slot 148 cut into the outer tubular member 35b of the handle 27b. The third cam 86b is also affixed to the operating rod 31b so that it rotates therewith.

The top of the cradle 28b is movable upward or downward relative to the bottom as indicated by broken lines in FIGURE 18. This movement is accomplished by means of the projection 147 engaging the upper part of cradle 28b shown in FIGURES 18 and 20.

As the cassette 10b is inserted inot the cradle, the upward projection 32b of the slide 33b passes through the center slot 24b of the blades 23b. As the knob 36b is turned counterclockwise, as viewed from the bottom, the operating rod 31b and the bolt 82b move upward. This causes the cam 85b to move upward until it engages cam 83b. Prior to such engagement of 83b and 85b, the projection 147 lifts the upper part of the cradle 28b permitting the cassette shells 11b and 12b to separate. This is illustrated by broken lines in FIGURE 18. Further lifting of bolt 82b effects engagement of cams 83b and 85b. Projection 147 on cam 85b lifts cradle 28b before release of the next blade 23b by camming of 32b to the opposite position.

When cam 85b engages cam 83b, cam 83b rotates approximately 180° in a snapping movement. This causes the projection 32b, bearing against the blade edges in the slot 24b to move the entire blade stack and release the surface blade from the retaining tabs 22b. The released blade snaps into the blade use position illustrated in FIGURE 18 in the same manner as described in connection with the first and second embodiments.

After a blade is thus released in the blade use position, the upper part of the cradle 28b is drawn downward by clockwise rotation of the knob 36b. This, in turn, draws the upper shell 11b toward the lower shell 12b and clamps the edge portions of the blade to impart a desired curvature to the blade in the blade use position.

After the blade becomes worn and it is desired to replace it with a new blade, the upper part of the cradle 28b and the upper shell 11b are drawn further downward by additional clockwise rotation of the knob 36b until the grasping lip 40b on the upper shell snaps over the cutting edge of the blade. At this time cam 85b engages cam 86b and imparts to it a slight rotation which causes the operating rod 31b and cam 83b to undergo a slight rotation. The purpose of this is to assure engagement of cams 83b and 85b slope to slope so that when cam 85b is moved upward for the next blade release, a proper cam action will result as described above. Without this slight rotary movement cam 85b might remain in the limit position at the end of its first 180° turn. Thus, subsequent upward movements of cam 85b would not impart the rotary movement but would merely push the peak of one cam back into the valley of the other.

FIGURES 23 through 30 show a fourth embodiment of the present invention. In this embodiment the retaining means are moved to release the blades instead of moving the blades relative to fixed retaining means.

The cassette 10c is formed by an upper elongated concave shell 11c and a lower elongated concave shell 12c. When these two shells are assembled, four resilient corner tabs 13c, carried by the upper shell, bear against four resilient corner tabs 14c on the lower shell. (See FIGURES 24, 25 and 26.) As the two shells are drawn together, the mating corner tabs move outward slightly. When the two shells move apart, the mating corner tabs move inward.

As in the other embodiments, the lower shell 12c is provided with means for retaining a stack of blades 23c. Such means include a pair of retaining tabs 22c extending upward from a slide member 33c mounted just under the head and extending through the upper part of handle 27c. The post 31c is secured to the upper shell 11c preferably integral therewith.

The blades 23c are stacked and retained in the lower shell 12c in flexed condition under the retaining tabs 22c.

Instead of the latch structure 37–38 as shown in the other embodiments, the handle 27c is threaded at 168 onto a threaded end of post 31c. The lower shell 12c is directly secured to the handle 27c by means of a pair of fingers 170 clutching in a groove 169 at the upper end of the handle (FIGURE 27). By holding the fingers 170 with one hand and turning the handle 27c with the other hand, the post 31c is drawn into or moved out of the well 168 in the handle. This, in turn, moves the upper shell towards and away from the lower shell.

In the assembly of the cassette, the post 31c is passed through the bifurcated post 177 at the top of handle 27c. 177 and 31c may be keyed together, e.g., by ridges 178 engaging in slots 179 in the post 177. The post 31c straddles the slide 33c in its transverse slot 180.

When the upper shell 11c moves downward, the longitudinal edges of the upper shell bear against the top surface of the blade in the blade use position, and the longitudinal edges of the lower shell 12c bearing against the bottom surface of the blade, impart the desired curvature to the blade. The amount of curvature of the blade 23c is adjusted by the amount that the upper shell 11c is drawn downward.

After the blade has been used, it is moved out of the blade use position as in the other embodiments. After the upper shell is moved to the position shown in FIGURE 25, a new blade may be released from the retaining tabs 22c.

The razor illustrated in FIGURES 23 through 30, inclusive, is so designed as to prevent a release of a new blade from the lower shell 12c while another blade is in position for use. The post 31c carries a key 182 which extends downward toward the slide 33c and fits into one of a pair of recesses 183 in the slide 33c (see FIGURE 28) when the post 31c is in position to bring a blade into the use position. With the post 31c and the upper shell 11c in the positions illustrated in FIGURES 24 and 27, the key 182 does not extend into either of the recesses 183 so that the slide 33c may be moved in either direction to release the blades. With the post 31c and the upper shell 11c in the positions illustrated in FIGURES 25 and 28, the key 182 extends partially into one of the recesses 183. With the post 31c and the upper shell 11c in the positions illustrated in FIGURE 26, the key 182 extends further into one of the recesses 183. For either of the last two conditions the key 182 locks the slide 33c so that blades may not be released. The two recesses 183 correspond to the two limits of sliding of 33c. In each position, one of said recesses is in register with key 182.

FIGURES 31 through 34 show a fifth embodiment of the present invention. As with the others corresponding elements have corresponding reference numerals, and in general the structure and use are the same, but this embodiment differs from all of the preceding embodiments in that the cassette is a single piece cassette while the others are two-piece cassettes.

A plurality of blades 23d, only one of which is shown for the sake of clarity, are retained under a rotatable retaining member 202 in the lower blade storage portion of a cassette 10d. The cassette has a threaded operating rod 31d secured to the cassette by means of a screw or threaded stud 37d secured to the top of the cassette and received by a threaded socket in the operating rod. The operating rod passes through the rotatable retaining member 202 and into a well in the handle 27d. The well is provided with a key 208 of square or other cross-section adapted for engaging the operating rod 31d so that upon rotation of the handle, the operating rod also rotates. The rotatable retainer 202 is turned by means of a lever arm 201 connected to the neck 205 of the retaining member. The operating rod 31d passes through the neck 205 and may rotate freely therein.

As best shown in FIGURE 34, the blades 23d are asymmetrical in that the blades have triangular cutouts at their centers. Each blade in the stack is provided with a similar triangular cutout, but the cutouts of adjacent blades are offset by a prescribed angle.

The retainer 202 is provided with three prongs 204 spaced 120° apart and of radius less than the radius to the vertices of the triangle, but greater than the radius to the base of the triangle. When the rotatable member 202 is turned so that the prongs 204 become aligned with the vertices of the triangular cutout of the surface blade, the surface blade is released. Since the triangular cutout of the next blade is angularly offset from that of the released blade, the new surface blade is held under the prongs until the retaining member 202 is again rotated through the prescribed angle.

As the handle 27d is turned, the operating rod 31d is also turned by reason of engagement with the key 208. The released blade 23d engages the lower end of the thread on the operating rod 31d and is carried upward as the operating rod is turned until the blade reaches the position illustrated in FIGURE 32. The blade is now positioned for use. In order to impart the desired curvature to the blade the operating rod is further turned in the original direction until the sharp edges turn down over the guard edges 39d.

To replace a used blade, the operating rod 31d is turned further in the same direction by the handle 27d to carry the used blade further upward. At a particular point the blade 23d snaps under a pair of grasping lips 40d and is captured by the grasping lips. At this point the blade 23d is positioned on an unthreaded portion of the operating rod so that additional turning of the operating rod has no effect on the captured blade.

In an alternate form of the razor shown in FIGURES 31 through 34, inclusive, the lower half of the operating rod 31d may be unthreaded since the flexed blades, upon release from the retaining member 202, will snap up against the threaded portion of rod 31d if the surface of the operating rod is smooth.

FIGURE 35 is a plan view of another razor blade 23e which may be employed in the FIGURE 31 embodiment of the invention. Because of the cutout sections 290, the profile of the flexed blade in storage is reduced so that the profile of the cassette may, in turn, be reduced.

Referring to FIGURE 36, there is shown a razor blade 23f of standard configuration and a spacer 301. Spacer 301 is seen to be asymmetrical in that a left-hand slot 302 is closer to the left-hand edge of the spacer than a right-hand slot 303 is to the right-hand edge of the spacer. A razor constructed in accordance with the present invention may employ razor blades of standard configuration by loading the cassette with such standard blades alternating with asymmetrical spacers interposed between them. The various release mechanisms described in connection with each of the embodiments are effective in releasing one blade at a time in that these mechanisms act upon asymmetrical spacer 301 in the same manner as they act upon asymmetrical blades. The asymmetrical spacer may be of a plastic or similar material which will withstand exposure to water when the razor is being rinsed.

Although in all five embodiments of the invention described above new blades are stored in the lower portion of the cassette and old blades are stored in the upper portion of the cassette, these storages may be reversed with only minor changes to the remainder of the razor.

FIGURES 10 and 14 show how an indicator may be arranged on a razor so as to aid in the setting of a desired blade curvature for a particular user. Specifically, a pin 300 is affixed to the square tubular member 82 and moves up and down in a slot 311 as the square tubular member moves up and down. A scale "1, 2, 3, . . ." is provided along the slot 311. Since the position of the pin 300 corresponds to a particular curvature of a blade in the use position, the scale provides an indication of this curvature. In addition, the uppermost position of the pin 300 in the slot 311 corresponds to a level of the square tubular member 82 at which the upper shell is at its uppermost position and a new blade may be released, while the lowermost position of the pin 300 in the slot 311 corresponds to a level of the square tubular member 82 at which the upper shell is at its lowermost position and a worn blade has been captured. These two positions of the pin 300 are designated at the ends of slot 311 by "NEW BLADE" and "BLADE DISPOSAL," respectively.

It should be pointed out that for a razor having such an indicator, the tubular member 82 need not be of square cross-section to prevent its rotation, since the pin 300 projecting through the slot 311 will prevent rotation of the tubular member 82 with respect to outer tubular member 35a. Furthermore, while this indicator is shown in connection with the second embodiment of the invention, it will be apparent that it may be employed in the other embodiments with equal facility.

While there have been described what are at present considered to be preferred embodiments of this invention it will be obvious to those skilled in the art that various changes and modifications may be made therein without departing from the invention and it is, therefore, intended to cover all such changes and modifications within the spirit or scope of the invention.

What is claimed is:

1. A replaceable cassette loaded with razor blades comprising:
   a cassette having first and second blade storage portions and a blade use portion having at least one elongated slot from which a blade cutting edge may porject when a blade is in said blade use portion;
   and a plurality of blades stacked in said first blade storage portion, said blades having opposite, alternately projecting edge portions adapted to be engaged alternately by a retaining foot, whereby when said foot is engaged on one such edge portion the surface blade is held down with the stack, but when such foot is engaged at the other edge portion, the next blade of the stack is so held down and the top blade is released.

2. A cassette loaded with razor blades comprising:
a cassette having first and second blade storage portions and a blade use portion having at least one elongated slot from which a blade cutting edge may project when a blade is in said blade use portion;
and a plurality of blades alternately stacked in said first blade storage portion, each of said blades having a cutout so arranged that when an identical blade is inverted and positioned against the first mentioned blade and the edges of both blades are aligned, said cutout patterns of the two blades are offset longitudinally.

3. A cassette loaded with razor blades comprising:
a cassette having first and second blade storage portions and a blade use portion having at least one elongated slot from which a blade cutting edge may project when a blade is in said blade use portion;
and a plurality of blades stacked in said first blade storage portion and each of said blades having a retainer engaging portion, said blades stacked with said retainer engaging portions respectively of alternate blades offset beyond adjacent blades and located at different areas, whereby a retainer foot may engage one while a foot is removed from the other area on an overlying blade.

4. A cassette loaded with razor blades comprising:
a cassette having first and second blade storage portions and a blade use portion having at least one elongated slot from which a blade cutting edge may project when a blade is in said blade use portion, said cassette also having a retaining member for retaining a plurality of blades in said first blade storage portion;
and a plurality of blades stacked and retained in said first blade storage portion in flexed condition by said retaining member, each of said blades having a cutout offset from that of adjacent blades, by being inverted and positioned against the first mentioned blade with the edges of both blades aligned, but said cutouts of the two blades being offset.

5. A cassette loaded with razor blades comprising:
upper and lower elongated concave shells joined together by means adapted for relative vertical movement between said shells at at least one edge thereto, adjacent longitudinal edges of said shells forming a pair of elongated slots from which blade cutting edges may project, said lower shell having a plurality of retaining tabs;
and a plurality of blades stacked and retained in said lower shell in flexed condition by said retaining tabs, each of said blades having a cutout pattern so arranged that when an identical blade is inverted and positioned against the first mentioned blade and the edges of both blades are aligned, said cutout patterns of the two blades are offset.

6. A cassette loaded with razor blades comprising:
a cassette formed by upper and lower elongated concave shells hinged together along one longitudinal edge of said cassette and joined together at a second longitudinal edge of said cassette by means which permit relative rotary movement between said shells about said hinged edge, the adjacent longitudinal edges of said shells forming an elongated slot along said second longitudinal edge, said lower shell having a plurality of retaining tabs extending from the inside surface thereof;
and a plurality of blades stacked and retained in said lower shell in flexed condition by said retaining tabs, each of said blades having a cutout pattern so arranged that when an identical blade is inverted and positioned against the first mentioned blade and the edges of both blades are aligned, said cutout patterns of the two blades are offset.

7. A cassette loaded with razor blades comprising:
a cassette having first and second blade storage portions and a blade use portion having at least one elongated slot from which a blade cutting edge may project when a blade is in said blade use portion;
a plurality of razor blades stacked in said first blade storage portion;
and a plurality of asymmetrical spacers alternately interposed between said blades in opposite directions, each of said spacers having first and second edge portions so arranged that when an identical spacer is inverted and positioned against the first mentioned spacer and said first edge portions of both spacers are aligned, said second edge portions of the two spacers are offset.

8. A cassette loaded with razor blades comprising:
a cassette having first and second blade storage portions and a blade use portion having at least one elongated slot from which a blade cutting edge may project when a blade is in said blade use portion, said cassette also having a retaining member for retaining a plurality of blades in first blade storage portion;
a plurality of razor blades stacked and retained in said first blade storage portion in flexed condition;
and a plurality of asymmetrical spacers alternately interposed between said blades in opposite directions, each of said spacers having a cutout pattern so arranged that when an identical spacer is inverted and positioned against the first mentioned spacer and the edges of both spacers are aligned, said cutout patterns of the two spacers are offset.

References Cited

UNITED STATES PATENTS

| | | | |
|---|---|---|---|
| 2,624,109 | 1/1953 | Cardenas | 30—40 |
| 2,989,805 | 6/1961 | Bringewald | 30—40 |

SAMUEL F. COLEMAN, Primary Examiner